Oct. 17, 1967      P. R. STAPLES      3,348,009

CALIBRATION MEANS FOR TEMPERATURE RESPONSIVE DEVICE

Filed Sept. 27, 1965

INVENTOR.
PAUL R. STAPLES
BY *Richard L. Caslin*
HIS ATTORNEY

United States Patent Office 3,348,009
Patented Oct. 17, 1967

3,348,009
CALIBRATION MEANS FOR TEMPERATURE
RESPONSIVE DEVICE
Paul R. Staples, Louisville, Ky., assignor to General
Electric Company, a corporation of New York
Filed Sept. 27, 1965, Ser. No. 490,239
4 Claims. (Cl. 200—140)

The present invention relates to the construction and arrangement of a temperature responsive control device and particularly to a calibration means for adjusting the accuracy of the average temperature control point of the device. One example of utility for this invention would be a hydraulic thermostat for controlling the temperature of a domestic electric oven.

Hydraulic thermostats are available on the market having a temperature sensor in the form of an elongated bulb or probe formed at the end of a capillary tube that is joined at the other end to an expansible member which has a bellows or diaphragm operating upon a snap-acting switch mechanism. This general type of thermostat is disclosed in the Ettinger Patent No. 2,260,014 which is assigned to the General Electric Company, the assignee of the present invention. As engineers continue their search for simpler and more reliable temperature control devices, important improvements are made both in the design area and in the manufacturing techniques employed. In order to obtain an accurate control of temperature, it is necessary to provide the thermostat with calibrating means for adjusting both the hysteresis or temperature gradient between the ON and OFF temperatures as well as the accuracy of the average temperature control point.

The principal object of the present invention is to provide a temperature responsive control device with a dual function calibration means for altering the relative position of a temperature responsive expansible member with relation to the supporting housing of the device and hence with respect to the switching mechanism of the device.

A further object of the present invention is to provide a hydraulic thermostat with a simplified manner of supporting the manual control shaft of the thermostat so that the position of the shaft may be altered with respect to the supporting housing so as to improve the accuracy of the average temperature control point of the device.

A further object of the present invention is to provide a dual function calibration means and shaft supporting means for a hydraulic thermostat in the form of a snap-on clip member that is adjustable by use of a key member.

The present invention, in accordance with one form thereof, is embodied in a temperature responsive control device having a housing with a manually adjustable expansible member mounted in one wall thereof. The expansible member serves as the actuating means of an electrical switching arrangement of a circuit in which the device is adapted to be used as a control device. The expansible member is supported from a shaft that is in turn supported in a bushing. The bushing is assembled to the housing by means of an annular clip member that serves to lock the bushing within the wall opening and also becomes an integral part of the bushing. An indexing means is adapted to engage the clip member for changing the angular position of the bushing relative to the housing.

My invention will be better understood from the following description taken in conjunction with the accompanying drawing and its scope will be pointed out in the appended claims.

Figure 1:
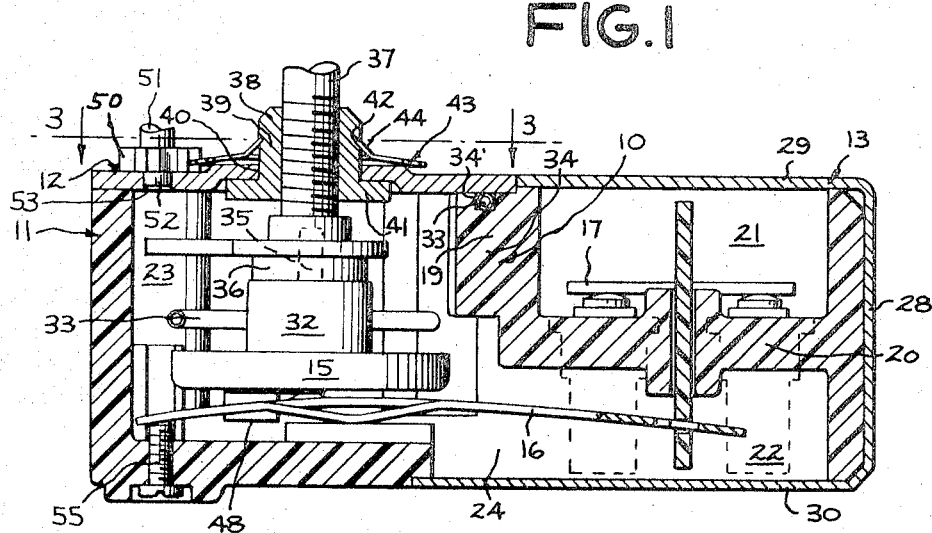
FIGURE 1 is a longitudinal cross-sectional elevational view on an enlarged scale taken through the center of the housing of an oven thermostat embodying the present invention.

Referring in detail to the drawing and in particular to FIGURE 1, 10 represents the hollow housing of an oven thermostat comprising a recessed base 11 and a two-piece cover means 12 and 13, respectively for closing the base. This thermostat or temperature responsive control device comprises three main elements in addition to the housing 10; namely, an expansible member 15, a snap-acting spring mechanism 16, and an electrical switch means 17. This particular thermostate design is the same as is described and claimed in my earlier application Ser. No. 474,246, now Patent No. 3,293,394, entitled, "Temperature Responsive Control Device With Snap Acting Switch" which issued on December 20, 1966, and is assigned to the General Electric Company, the assignee of the present invention. It is deemed well, however, to de- scribed many of the elements of this thermostat design as background information before delving into the particular invention covered herein.

Figure 2:
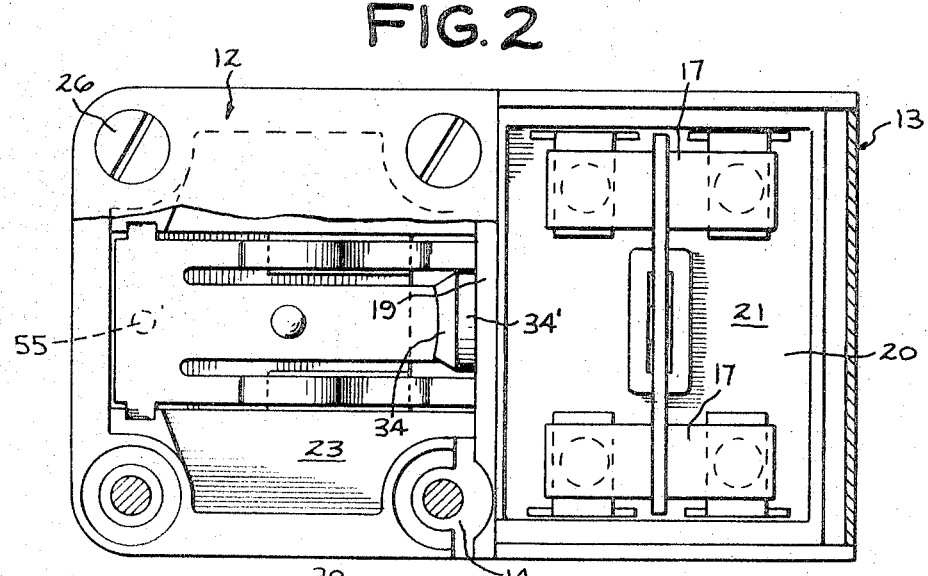
FIGURE 2 is a plan view of the thermostat of FIGURE 1 with parts of the cover broken away and the expansible member removed to show the features of both the combined blade and amplitude spring as well as the electrical switch mechanism.

The recessed base 11 of the housing 10 is a box-like member of molded plastic such as phenolic resin or the like insulating material, while the two cover means 12 and 13 are sheet metal parts. The shape of the base 11 is generally rectangular in plan view as is best seen in FIGURE 2. The base is divided into two substantially equal sections by a transverse vertical partition 19. The first section at the right side of the partition 19 in FIGURE 2 is adapted to accommodate the switch means 17, while the second section at the left side of the partition accommodates the expansible member 15, as is best seen in the assembly view of FIGURE 1. Moreover, the right hand section is divided by a horizontal partition 20 into a first upper compartment 21 and a second lower compartment 22. It is this first compartment 21 which encompasses the switch means 17 and electrically isolates these electrical parts from the remainder of the thermostat interior. Accordingly, the left hand section of the base for receiving the expansible member 15 may be considered as a third compartment 23. An opening 24 is formed in the lower portion of the transverse partition 19 in the area between the second compartment 22 and the third compartment 23 for receiving a portion of the spring mechanism 16 therethrough as is best seen in FIGURE 1.

The third compartment 23 of the base 11 is open at the top. The first cover plate 12 is of generally square shape and it is adapted to close the third compartment 23 by being fastened over the top opening thereof and held in place by the fastening screws located in the four corners thereof. The first compartment 21 is also open at the top, while the second compartment 22 is open only at the bottom. The second cover means 13 is designed to close both of the first and second compartments 21 and 22 respectively. Thus, the second cover means 13 is of generally U-shape in side view and it snaps into place over the top, side and bottom of the right hand section of the base 11. This cover means 13 has a top horizontal arm 29, a vertical bight portion 28 and a horizontal bottom arm 30. The two arms 29 and 30 of the cover 13 are slightly converging so that they must be sprung apart slightly in order to force them over the right side of the base 11. Once they reach the closed position shown in FIGURE 1, they are firmly held in place and cannot be dislodged.

The expansible member 15 is a hydraulic-filled bellows or diaphragm assembly 32 that converts volumetric expansion or contraction into direct linear motion acting upon the spring mechanism 16. A capillary tube 33 of about two feet in length is connected at one end into the side of the diaphragm assembly. This tube is adapted to extend out of the base 11 so that its free end may be positioned within the area whose temperature is to be controlled, such as a baking oven. Provided on the free end of the tube would be an elongated sensing bulb or probe (not shown) as is conventional in this art. As is best seen in FIGURE 1, the transverse partition 19 is provided with a side extension 34 located within the third compartment 23. This extension 34 has a top surface with an undercut seat 34' for receiving the capillary tube 33. From this seat 34' the capillary tube 34 extends out through an aligned slot 14 in the side of the base as is shown in FIGURE 2.

Figure 3:
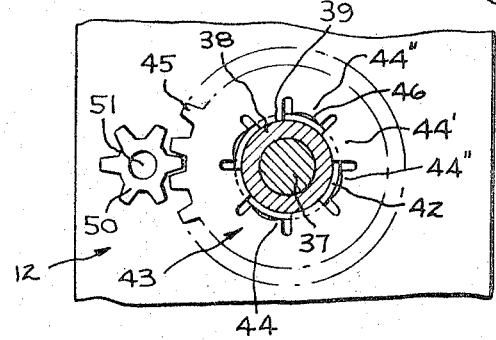
FIGURE 3 is a fragmentary plan view taken on the line 3—3 of FIGURE 1 showing the calibrating means for the shaft of the expansible member.

It is necessary to be able to adjust the vertical position of the expansible member 15 with respect to the cover plate 12 of the housing as well as with respect to the spring mechanism 16 so as to correct the average temperature control point of the thermostat. The top of the diaphragm assembly or reservoir 32 is provided with a vertical pin 35 (shown in dotted lines in FIGURE 1) which is freely received within a mating hole in a collar 36 that is fastened on the lower end of a threaded adjustment shaft 37. The shaft extends through the cover plate 12 and is held therein by a tapped bushing 38. This bushing has a barrel 39 which is adapted to fit through a close-fitting opening 40 in the cover plate 12. A shoulder 41 is formed on the lower end of the barrel 39 for seating against the underside of the cover plate 12. An annular groove 42 is cut in the outer surface of the barrel 39 to form a ledge so that an annular clip member 43 may be slipped first over the shaft and then forced over the barrel 39 of the bushing 38 to hold the bushing in a firm manner. As is best shown in the plan view of FIGURE 3, the annular clip member 43 has inwardly directed radial spring fingers 44 on its inner periphery and a spur gear tooth profile 45 on its outer periphery. The spring fingers 44 are of alternate designs. One set of alternate fingers 44' have their free ends seated in the barrel groove 42, while a second set of shorter fingers 44'' each have a V-notched free end 46 forming locking points that dig into the side of bushing 38 and prevent relative rotational movement between the bushing and clip member 43. Hence the clip member 43 becomes an integral part of the bushing 38.

The gear tooth profile 45 of the clip member 43 is adapted to be engaged by a pinion gear or turnkey 50 which has a shaft 51 with an upper handle (not shown) and a lower pilot pin 52 that is to be inserted in a shaft seat 53 in the cover 12 as is best seen in FIGURE 1. The turnkey 50 is not a permanent element of the thermostat, but is equivalent to a key for use with a lathe chuck for adjusting the jaws of the chuck. Thus, the average temperature control point of the thermostat can be changed either in the factory during the assembly of the thermostat or in the customer's home by an appliance serviceman by changing the rotational position of the bushing 38 with respect to the cover 12. The pinion gear 50 is turned and this serves to move the clip member 43 and hence the bushing 38 since the bushing is made integral with the clip member by means of the spring fingers 44''. While this is being done it is necessary to hold the shaft 37 from turning. Thus, the shaft moves either up or down with respect to the cover 12 and spring mechanism 16 depending upon the direction of rotation of the bushing.

As a matter of general interest not forming part of the present invention, the thermostat has a second calibration point; namely, an adjusting screw 55 in the bottom wall of the base 11 which extends in a vertical manner and underlies the pivotal end of the spring blade 16 as is best seen in FIGURES 1 and 2. By adjusting this calibration screw 55 it is possible to change the hysteresis or temperature differential between the ON and OFF temperatures of the thermostat.

The diaphragm 15 is prevented from turning when the shaft 37 is turned by an inverted U-shaped clip member 48 that has its base integral with the diaphragm and overlies the overcenter spring blade 16 as is best seen in FIGURE 1.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A thermostatic control device comprising a housing enclosing a temperature responsive expansible member, a snap-acting spring mechanism, and an electrical switching means, the expansible member bearing upon the spring mechanism for changing the loading thereon as a function of temperature, the spring mechanism being connected to the switching means and serving as a switch actuator for making and breaking an electrical circuit in which the control device is adapted to be installed, the expansible member being carried on an adjustable shaft which extends outwardly of the housing and serves as a manually settable means for varying the average temperature control point of the device, adjustable means for mounting the said shaft in and through one wall of the housing, said adjustable means including a shouldered bushing located within an opening in said one wall, the shaft being threaded through the bushing, and a deformable annular clip member fixed to the outer end of the bushing for holding the bushing in the wall opening and preventing the bushing from turning, the annular clip member having an outer periphery with spaced teeth, and an indexing means for engaging and turning the clip member so as to turn the bushing while the shaft is adapted to be held from turning so as to move the shaft throught the supporting wall of the housing, the indexing means being a pinion that has a pilot pin seated in a wall of the housing, the pinion being adapted to mesh with the said teeth for turning the clip and bushing as a unit.

2. A thermostatic control device as recited in claim 1 wherein the annular clip member has an inner periphery with a plurality of spring fingers, the said bushing having an annular ledge, certain spring fingers being engageable with the ledge for holding the bushing firmly in the said wall opening, other spring fingers being engageable with the bushing for preventing the relative rotation of the bushing with respect to the clip member.

3. A hydraulic thermostat comprising a hollow housing enclosing a temperature responsive expansible member and an electrical switching mechanism which is governed thereby, the expansible member being rotatably connected to the shaft member, one wall of the housing having an opening with a threaded bushing located therein, the shaft extending through and being supported by the bushing, and an annular clip member fitted over the outer end of the bushing for both locking the bushing in the wall opening and becoming an intergral part of the bushing, and a key member removably supported by the housing and drivingly engaging the clip member for changing the angular position of the bushing relative to the housing.

4. A hydraulic thermostat comprising a hollow housing enclosing a temperature responsive expansible member and an electrical switching mechanism which is governed thereby, the expansible member being rotatably connected to a shaft member, one wall of the housing having an opening with a threaded bushing located therein, the shaft extending through and being supported by the bushing, and an annular clip member fitted over the bushing for both locking the bushing within the wall opening and becoming an integral part of the bushing, said clip member having an inner periphery with a plurality of spring fingers, the said bushing having an annular ledge, certain spring fingers being engageable with the ledge for holding the bushing firmly in the said wall opening, other spring fingers being engageable with the bushing for preventing the relative rotation of the bushing with respect to the clip member, the said clip member having an outer periphery with spaced teeth, and a key member in the form of a pinion that has a pilot pin seated in a wall of the housing, the pinion being adapted to mesh with the said teeth for turning the clip and hence the bushing as an integral unit.

References Cited

UNITED STATES PATENTS

| | | | |
|---|---|---|---|
| 2,270,736 | 1/1942 | Kuhn | 200—140 |
| 2,827,535 | 3/1958 | Simons | 200—166 |
| 2,943,177 | 6/1960 | Wantz | 200—140 X |
| 3,114,813 | 12/1963 | Durst | 200—140 |

BERNARD A. GILHEANY, *Primary Examiner.*

G. MAIER, H. B. GILSON, *Assistant Examiners.*